United States Patent
Jun et al.

(10) Patent No.: US 10,051,839 B2
(45) Date of Patent: Aug. 21, 2018

(54) ANIMAL EXERCISER SYSTEM

(71) Applicant: Petronics Inc., Champaign, IL (US)

(72) Inventors: David Jun, Urbana, IL (US); Michael Friedman, Champaign, IL (US); David Cohen, Champaign, IL (US)

(73) Assignee: Petronics Inc., Champaign, IL (US)

( * ) Notice: Subject to any disclaimer, the term of this patent is extended or adjusted under 35 U.S.C. 154(b) by 44 days.

(21) Appl. No.: 15/405,666

(22) Filed: Jan. 13, 2017

(65) Prior Publication Data

US 2017/0196199 A1    Jul. 13, 2017

Related U.S. Application Data

(60) Provisional application No. 62/278,233, filed on Jan. 13, 2016, provisional application No. 62/357,974, filed on Jul. 2, 2016.

(51) Int. Cl.

| | |
|---|---|
| *A01K 15/02* | (2006.01) |
| *H04M 1/725* | (2006.01) |
| *G05D 1/00* | (2006.01) |
| *G01C 21/20* | (2006.01) |

(52) U.S. Cl.
CPC .......... *A01K 15/027* (2013.01); *A01K 15/021* (2013.01); *G01C 21/206* (2013.01); *G05D 1/0016* (2013.01); *H04M 1/72544* (2013.01)

(58) Field of Classification Search
CPC .. A01K 15/027; A01K 15/021; G01C 21/206; G05D 1/0016; H04M 1/72544
See application file for complete search history.

(56) References Cited

U.S. PATENT DOCUMENTS

| | | | | |
|---|---|---|---|---|
| 5,651,049 A | * | 7/1997 | Easterling ........... | H04M 1/6505 340/7.63 |
| 6,773,344 B1 | * | 8/2004 | Gabai ..................... | A63H 3/28 463/1 |
| 2010/0005700 A1 | * | 1/2010 | Thomas ................. | A01K 85/01 43/17.1 |
| 2012/0058705 A1 | * | 3/2012 | Atsmon .................. | A63H 3/28 446/175 |
| 2013/0130587 A1 | * | 5/2013 | Cohen .................... | A63H 30/04 446/175 |
| 2015/0346722 A1 | * | 12/2015 | Herz ..................... | G05D 1/0038 701/2 |
| 2017/0280699 A1 | * | 10/2017 | Vashina ............... | A01K 91/065 |

* cited by examiner

*Primary Examiner* — Calvin Cheung
(74) *Attorney, Agent, or Firm* — David Grossman

(57) ABSTRACT

A system comprises a mobile device, a spatial profiling device, and a mobile device manager. The mobile device comprises a platform, a first communications circuit that receives navigation instructions, and a motion drive that propels the platform according to the navigation instructions. The spatial profiling device captures a spatial profile of a motion area. The mobile device manager comprises at least one second communications circuit that communicates with the first communications circuit and the spatial profiling device, processor(s), and memory storing processing instructions. The instructions, when executed, cause the mobile device manager to receive spatial profiles, locate the mobile object, locate the mobile device, plan a movement for the mobile device which avoids the mobile object, and communicate the movement to the mobile device as navigation instructions.

20 Claims, 15 Drawing Sheets

ANIMAL EXERCISER SYSTEM

CROSS-REFERENCE TO RELATED APPLICATIONS

This application claims the benefit of U.S. Provisional Application No. 62/278,233, filed Jan. 13, 2016, entitled "Animal Exerciser," and U.S. Provisional Application No. 62/357,974, filed Jul. 2, 2016, entitled "Animal Exerciser," which are both hereby incorporated by reference in their entirety.

BRIEF DESCRIPTION OF THE DRAWINGS

The accompanying figures are included to provide a further understanding, and are incorporated in and constitute a part of this specification. The drawings illustrate one or more embodiments. As such, the disclosure will become more fully understood from the following detailed description, taken in conjunction with the accompanying figures, in which.

DETAILED DESCRIPTION OF EMBODIMENTS

Embodiments may be employed to exercise and/or entertain an animal such as a cat and/or a dog.

Embodiments comprise a system that may comprise a mobile device, a spatial profiling device, and a mobile device manager. The mobile device may comprise a platform, a first communications circuit that receives navigation instructions, and a motion drive configured to propel the platform according to the navigation instructions. The spatial profiling device may capture a spatial profile of a motion area. The mobile device manager may comprise at least one second communications circuit that communicates with the first communications circuit and the spatial profiling device, processor(s), and memory storing processing instructions. The instructions, when executed, may cause the mobile device manager to receive spatial profiles, locate the mobile object, locate the mobile device, plan a movement for the mobile device which avoids the mobile object, and communicate the movement to the mobile device as navigation instructions.

Embodiments may comprise a process that may comprise receiving a spatial profile from a spatial profiling device, locating a mobile object employing the spatial profiles, locating a mobile device, planning a movement for the mobile device between a first location and a second location, and communicating the movement to the mobile device as navigation instructions employing a communications circuit. The movement may be configured to avoid the mobile object.

Embodiments may comprise a non-transitory tangible computer readable medium containing instructions configured to cause one or more processors to execute a process comprising: receiving spatial profiles from a spatial profiling device, locating a mobile object employing the spatial profiles, locating a mobile device, planning a movement for the mobile device between a first location and a second location, and communicating the movement to the mobile device as navigation instructions employing a communications circuit. The movement may be configured to avoid the mobile object.

This disclosure will now be described more fully with reference to the accompanying drawings, in which embodiments of this document are shown. This document should be read to include embodiments of many different forms and should not be construed as being limited to the embodiments set forth herein; rather, these embodiments are provided so that this disclosure will be thorough and complete, and will fully convey the concepts contained within this document to those skilled in the art.

Figure 1:
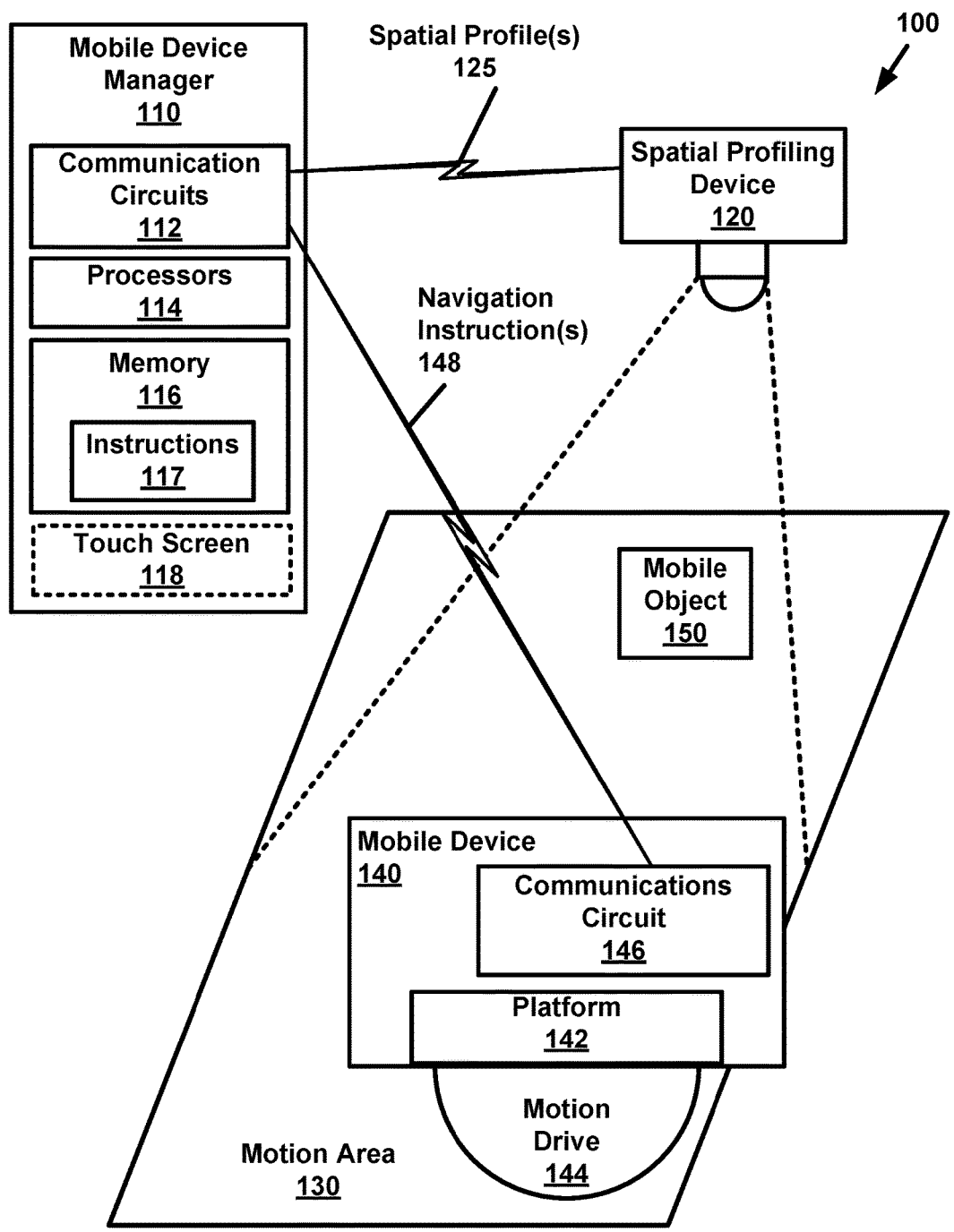
FIG. 1 is a system diagram of an animal exerciser system as per an aspect of an embodiment of the present invention.

Referring to FIG. 1, an animal exerciser system 100 is shown. According to an embodiment, the system 100 may comprise a mobile device 140, a spatial profiling device 120, and a mobile device manager 110. According to an embodiment, at least the mobile device 140 and a mobile object 150 may be disposed within a motion area 130.

The mobile device 140 may further comprise a platform 142, a motion drive 144, and a communications circuit 146. In an embodiment, the motion drive 144 and communications circuit 146 may be disposed on the platform 142.

Motion drive 144 may be configured to receive navigation instructions and to propel platform 142 according to the navigation instructions. To accomplish this movement, motion drive 144 may comprise a battery to supply electricity, DC or AC motors, and control mechanisms such as, for example, an H bridge. Motion drive 144 may propel the platform using mechanisms such as wheels, flopping wheels, tracks, plungers, legs, magnets, compressed air, a combination thereof, and/or the like.

The at least one communications circuit 146 may be configured to communicate with communications circuit 112 disposed on the mobile device manager 110 via navigation instructions 148. This communication may occur via a wired interface, a wireless interface, a combination thereof, and/or the like. The communication may utilize wireless communication protocols such as Bluetooth®, LTE, Wi-Fi, radio waves, a combination thereof, and/or the like. The communications circuit 146 may send and/or receive navigation instructions 148. According to the navigation instructions 148, the motion drive 144 may be configured to propel the platform 142 to move mobile device 140.

The spatial profiling device 120 may comprise one or more sensors configured to collect spatial information in and/or around the motion area 130. Examples of sensors comprise cameras, proximity sensors, motion sensors, a combination thereof, and/or the like. The spatial profiling device 120 may comprise a webcam, infrared projector, 3D scanner systems, such as, for example, a Microsoft Kinect™, a combination thereof, and/or the like. The spatial profiling device 120 may operate using pairs of emitters and detectors to detect objects. The spatial profiling device may capture spatial profiles 125 of the motion area 130. Spatial profiles 125 may comprise images captured by sensors, such as a camera, or composites of the motion area 130 created using proximity sensors, motion sensors, a combination thereof, and/or the like. The spatial profiles 125 may be updatable and represent a depiction of the motion area 130.

The mobile device manager 110 may comprise at least one communications circuit 112, one or more processors 114, and memory 116. The at least one communications circuit 112 may be configured to receive spatial profiles 125 from the spatial profiling device 120. The at least one communications circuit 112 may be configured to communicate with communications circuit 146 disposed on the mobile device 140 via navigation instructions 148. According to an embodiment, the communications circuit 146 may direct the movement of mobile device 140 employing the navigation instructions 148. Processors 114 may comprise a microprocessor produced by microprocessor manufacturers such as Advanced Micro Devices, Inc. (AMD) of Sunnyvale, Calif., Atmel Corporation of San Jose, Calif., Intel Corporation of Santa Clara, Calif., or Texas Instruments Inc. of Dallas, Tex. Processors 114 may comprise and/or be other logic-based controllers such as FPGAs or PLCs. Memory 116 may comprise nonvolatile memory configured to store processing instructions. Examples of memory 116 comprise ROM, EEPROM, Flash, a combination thereof, and/or the like. Memory 116 may comprise volatile memory such as, for example, RAM.

Contained within memory 116 may be instructions 117 that, when executed, may cause the mobile device manager 110 to receive spatial profiles 125 from the spatial profiling device and locate mobile object 150 employing the spatial profiles 125. Mobile device manager 110 may locate mobile device 140. Mobile device manager 110 may plan a movement for mobile device 140 between a first location and a second location in motion area 130. The movement may be configured to avoid mobile object 150. The movement may be communicated to mobile device 140 as navigation instructions 148 by employing communications circuit 112. The processing instructions 117 may cause the mobile device manager 110 to plan the movement employing an expected movement of mobile object 150. The mobile device 140 may be located using infrared light. The mobile device 140 may be located employing a wheel encoder. Mobile device manager 110 may distinguish colors in received spatial profiles 125. Mobile device manager 110 may detect a distance of at least one of the mobile device 140 and the mobile object 150 from a known location in the received spatial profiles 125. The mobile object 150 may be located employing motion detection and background detection techniques.

According to an embodiment, mobile device manager 110 may comprise a touch screen display 118. According to an embodiment, the mobile device manager 110 may comprise a device containing a touch screen display such as, for example, a mobile phone, tablet, desktop, a laptop computer, a combination thereof, and/or the like. In embodiments utilizing touch screen display 118, memory 116 may contain instructions that, when executed, cause the mobile device manager 110 to show at least one of the spatial profiles on touch screen display 118. The mobile device manager 110 may also determine a second location via a selection on touch screen display 118.

The mobile object 150 may be an animal such as a cat, a dog, a human, and/or the like. The mobile object 150 may comprise a second mobile device. The second mobile device may be similar to mobile device 140. Essentially, mobile object 150 may be an item that has the capacity to move.

The motion area 130 may comprise a region of space in which the mobile device 140 and/or the mobile object 150 may operate. The mobile device 140 and/or the mobile object 150 may move in motion area 130. Further, spatial profiling device 120 may be configured to capture portions of motion area 130 and/or the entirety of motion area 130. According to an embodiment, motion area 130 may be a space within a home dwelling, a room, and/or the like.

Figure 2:
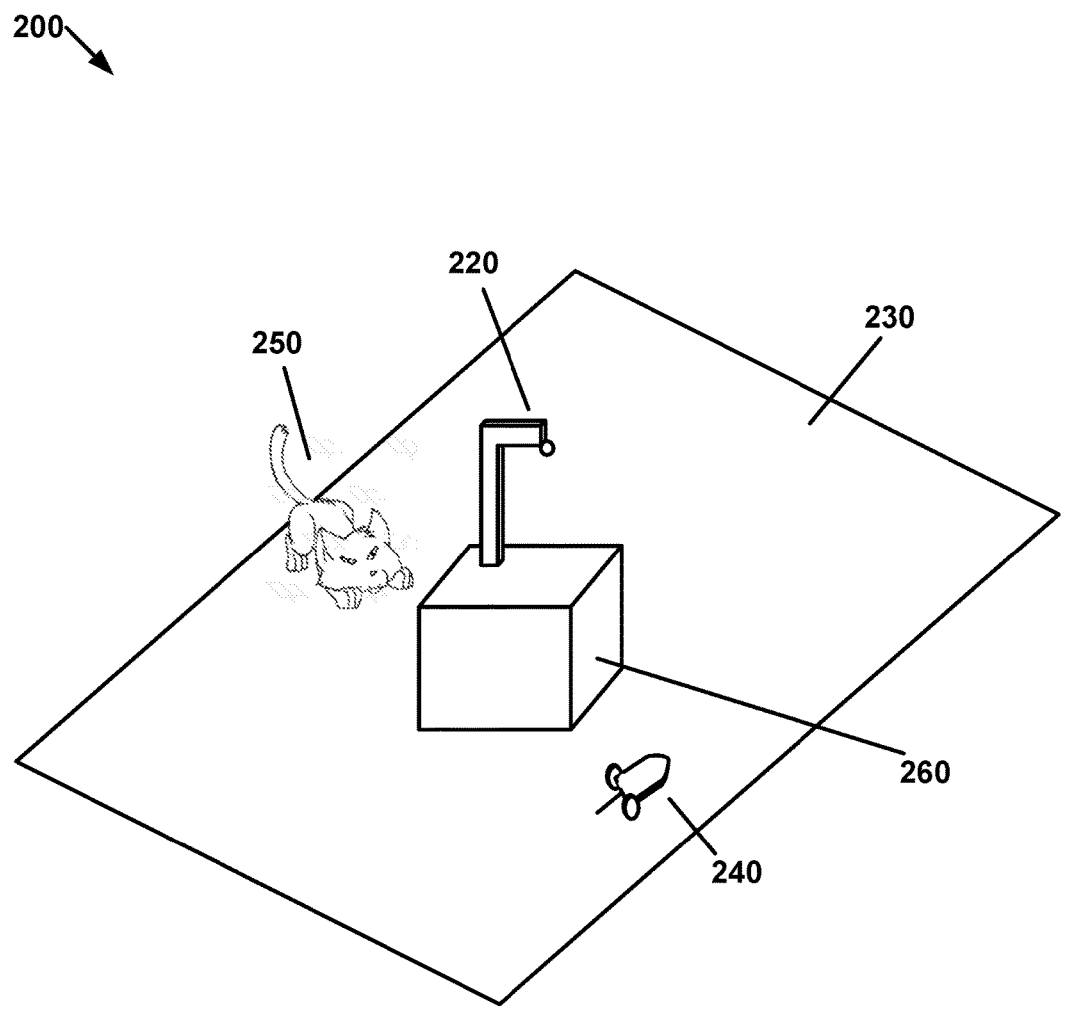
FIG. 2 is a system diagram of an animal exerciser system as per an aspect of an embodiment of the present invention.

Referring to FIG. 2, an animal exerciser system 200 is shown. According to an embodiment, system 200 may comprise a mobile device 240 and an obstacle 260. A spatial profiling device 220, that may be configured to capture a two or three dimensional spatial profile, may be positioned relative to and/or on the obstacle 260. System 200 may operate within motion area 230 and interact with mobile object 250. Mobile object 250 may comprise, as illustrated in this example, a cat.

In system 200, mobile device 240 may move to avoid mobile object 250 by positioning itself (mobile device 240) such that obstacle 260 is between mobile device 240 and mobile object 250. To accomplish this objective, obstacle 260, which may comprise processing features, may utilize a spatial profile of motion area 230. The spatial profile may be created employing spatial profiling device 220. According to an embodiment, obstacle 260 may comprise a preexisting piece of furniture either in a dwelling and/or outdoors. The processing may be performed in an attachment to the preexisting obstacle 260. According to an embodiment, spatial profiling device 220 may comprise a camera and the spatial profiles captured may comprise images. To capture motion area 230, the spatial profiling device 220 may utilize a wide-angle lens. In terms of positioning, spatial profiling device 220 may be positioned vertically above obstacle 260 so that spatial profiling device 220 may identify obstacle 260 within motion area 230. According to an embodiment, spatial profiling device 220 may be affixed on an arm that is attached to obstacle 260 at a height that allows spatial profiling device 220 to obtain a spatial profile of motion area 230. According to an embodiment, spatial profiling device 220 may identify mobile device 240 and mobile object 250 using spatial profiling assist equipment. For example, mobile device 240 may emit a beacon using a light emitting diode that may be in the visible and/or infrared spectrum that spatial profiling device 220 is configured to detect. In terms of tracking mobile object 250, the spatial profiling device 220 may utilize motion detection techniques. Thus, as mobile object 250 moves around obstacle 260, mobile device 240 may move to a position such that obstacle 260 is positioned between mobile device 240 and mobile object 250.

Figure 3:
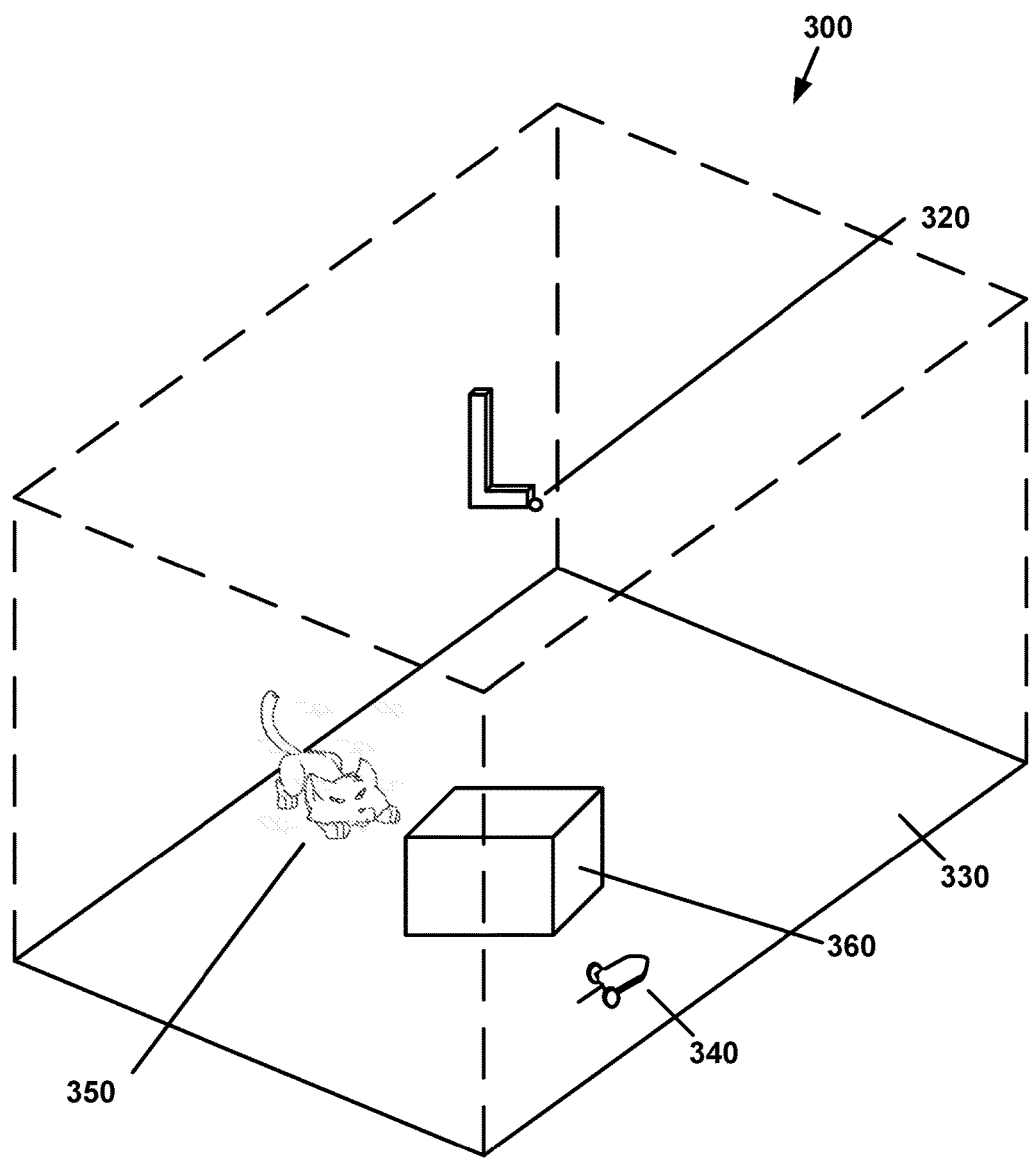
FIG. 3 is a system diagram of an animal exerciser system as per an aspect of an embodiment of the present invention.

Referring to FIG. 3, an animal exerciser system 300 is shown. In an embodiment, system 300 may comprise a mobile device 340, an obstacle 360, and a spatial profiling device 320. System 300 may operate within motion area 330 and interact with a mobile object 350. Mobile object 350 may be an animal such as the illustrated cat.

In contrast to system 200 depicted in FIG. 2, system 300 may utilize a spatial profiling device 320 that is detached from obstacle 360. According to an embodiment, spatial profiling device 320 may be attached to, for example, the ceiling of a room in order to capture motion area 330. Spatial profiling device 320 may comprise one or more sensors such as cameras, proximity sensors, motion sensors, a combination thereof, and/or the like. Motion area 330 may be a two and/or three dimensional space. Spatial profiling device 320 may also reside in alternative locations, such as, for example, on a tabletop, a counter, a shelf, other existing furniture within a room, a combination thereof, and/or the like. Further, for outdoor applications, spatial profiling device 320 may be mounted outside of a building, such as on the exterior of a building and/or home.

Figure 4A:
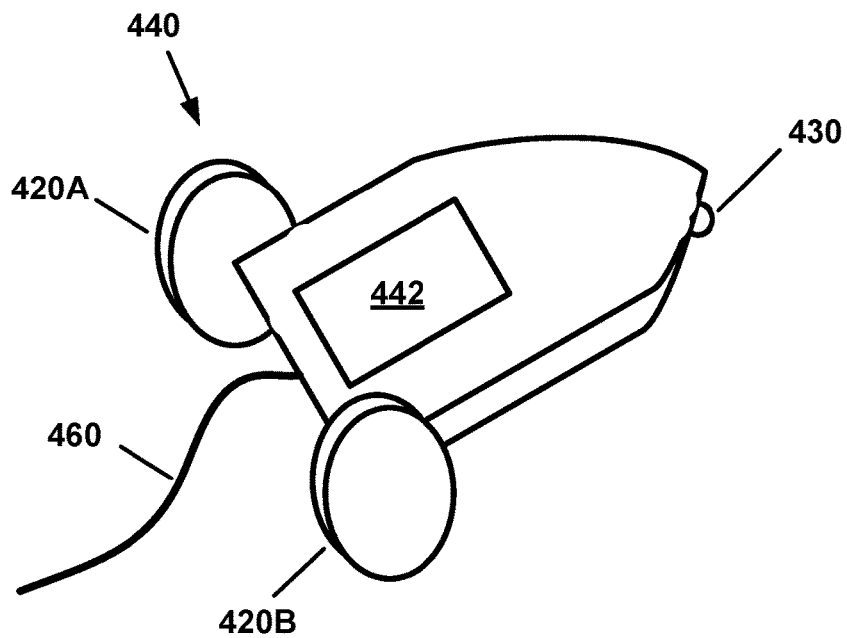
FIG. 4A is a system diagram of a mobile device as per an aspect of an embodiment of the present invention.

Referring to FIG. 4A, mobile device 440 is shown. According to an embodiment, mobile device 440 may comprise a mobile device platform 442, wheels 420A and 420B coupled to wheel encoders, a stability nub 430, and a tail 460. Mobile device platform 442 may be a surface upon which circuitry may be disposed. For example, platform 442 may be an insulated sheet and/or a type of circuit board. Mobile device platform 442 may be disposed with a plastic casing while wheels 420A and 420B may reside on the sides of the casing. The wheel encoders coupled to wheels 420A and 420B may provide information to the mobile device 440 circuitry and may be utilized, at least in part, to determine distance, speed, acceleration, combination thereof, and/or the like. Stability nub 430 may be positioned to balance the movement of mobile device 440. According to an embodiment, stability nub 430 may be a wheel. According to an embodiment, stability nub 430 may be a spherically shaped plastic. In terms of operation, platform 442 and wheels 420A and 420B may be placed in a manner configured to allow mobile device 440 to remain mobile even when in a flipped orientation. That is, the motion drive 444 may be configured to keep mobile device 440 functional and to propel platform 442 even when platform 442 is in a flipped orientation. According to an embodiment, tail 460 may comprise an attachment to entice the attention of a mobile object, such as a cat. Tail 460 may be a string but may also comprise various colors, noise makers such as a bell, other attention generating items, a combination thereof, and/or the like.

Figure 4B:
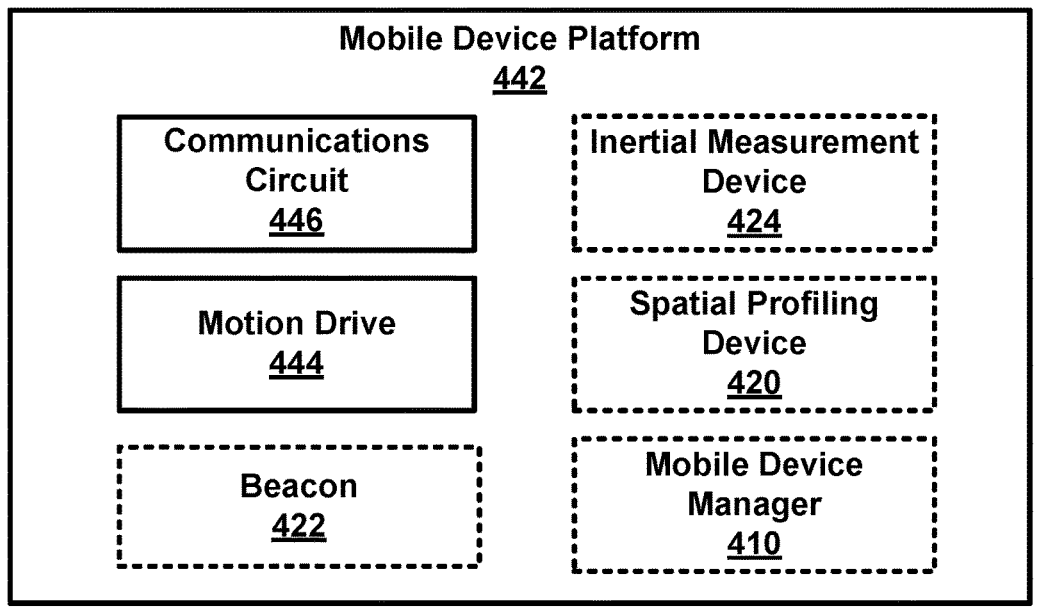
FIG. 4B is a block diagram of a mobile device platform as per an aspect of an embodiment of the present invention.

FIG. 4B is a block diagram of mobile device platform 442. According to an embodiment, platform 442 may comprise a communications circuit 446 and/or a motion drive 444. Communications circuit 446 may comprise circuitry configured to interface with other components contained on mobile device platform 442. Communication circuit 446 may be configured to communicate with systems external to the mobile device. For example, communications circuit 446 may send data concerning mobile device 440 such as distance measurements, speed measurements, inertial measurements, a combination thereof, and/or the like. Further, communications circuit 446 may be configured to receive instructions from an external system that may direct the movement of mobile device 440.

Motion drive 444 may be configured to receive navigation instructions and to move wheels 420A and 420B according to those instructions. To accomplish this movement, motion drive 444 may comprise a battery to supply electricity, DC or AC motors, and/or control mechanisms such as an H bridge. Motion drive 444 may also operate without employing wheels 420A and 420B and still propel platform 442 using such mechanisms such as tracks, plungers, legs, magnets, compressed air, a combination thereof, and/or the like.

Platform 442 may house a beacon 422. Beacon 422 may emit an electromagnetic signal. An electromagnetic signal may comprise a modulated wave or synchronized oscillations of electric and magnetic fields. Examples of electromagnetic signals comprise a signal in the ultraviolet, visible light, infrared, radio wave spectrum, a combination thereof, and/or the like. The signal emitted by beacon 422 may allow an external imaging device to detect mobile device 440.

Platform 442 may house an inertial measurement device 424. The inertial measurement device 424 may comprise, for example, a device configured to measure changes in acceleration, magnitude, and/or direction. Examples comprise an accelerometer and/or gyroscope configured to measure changes in acceleration of the mobile device 440. This information may be employed to determine the orientation of mobile device 440, collisions, unlevel terrain, other types of interactions that mobile device 440 may have with the environment, a combination thereof, and/or the like.

Platform 442 may operate without reference to an external system and house a spatial profiling device 420 along with a mobile device manager 410. This autonomous embodiment may utilize spatial profiling device 420 to generate spatial profile(s) of the environment in which mobile device 440 operates. Spatial profiling device 420 may comprise a camera mounted such that the lens captures visual information above mobile device 440. Spatial profiles may be created employing the images captured by the lens. Spatial profiling device 420 may comprise a light emitter and detector pair to generate a spatial profile. In this embodiment, a light emitter such as a light emitting diode may produce electromagnetic waves such as infrared light, ultraviolet light, visible light, a combination thereof, and/or the like. The detector may be, for example, a light emitting diode, a photodiode, a phototransistor, a combination thereof, and/or the like. The detector may be configured to capture reflections of the emitted light, and using the reflections, create a spatial profile of the environment surrounding mobile device 440. That is, the spatial profiles may map the locations of objects as well as predict the location of obstacles. According to an embodiment, spatial profiling device 420 may comprise several emitter/detector pairs.

Utilizing the spatial profiles, mobile device manager 410 may direct the movement of mobile device 440 to avoid obstacles as well as other mobile objects that may obstruct the movement of mobile device 440. Mobile device manager 410 may utilize communications circuit 446 to control motion drive 444 to execute these maneuvers. Mobile device manager 410, however, may also utilize instructions received by the communications circuit with or without information from the spatial profiling device 420 in order to direct the movement of mobile device 440. Mobile device 440 may operate without the need for any external navigation instructions but may still have the capability to receive and utilize commands or instructions sent from an external system.

Figure 5:
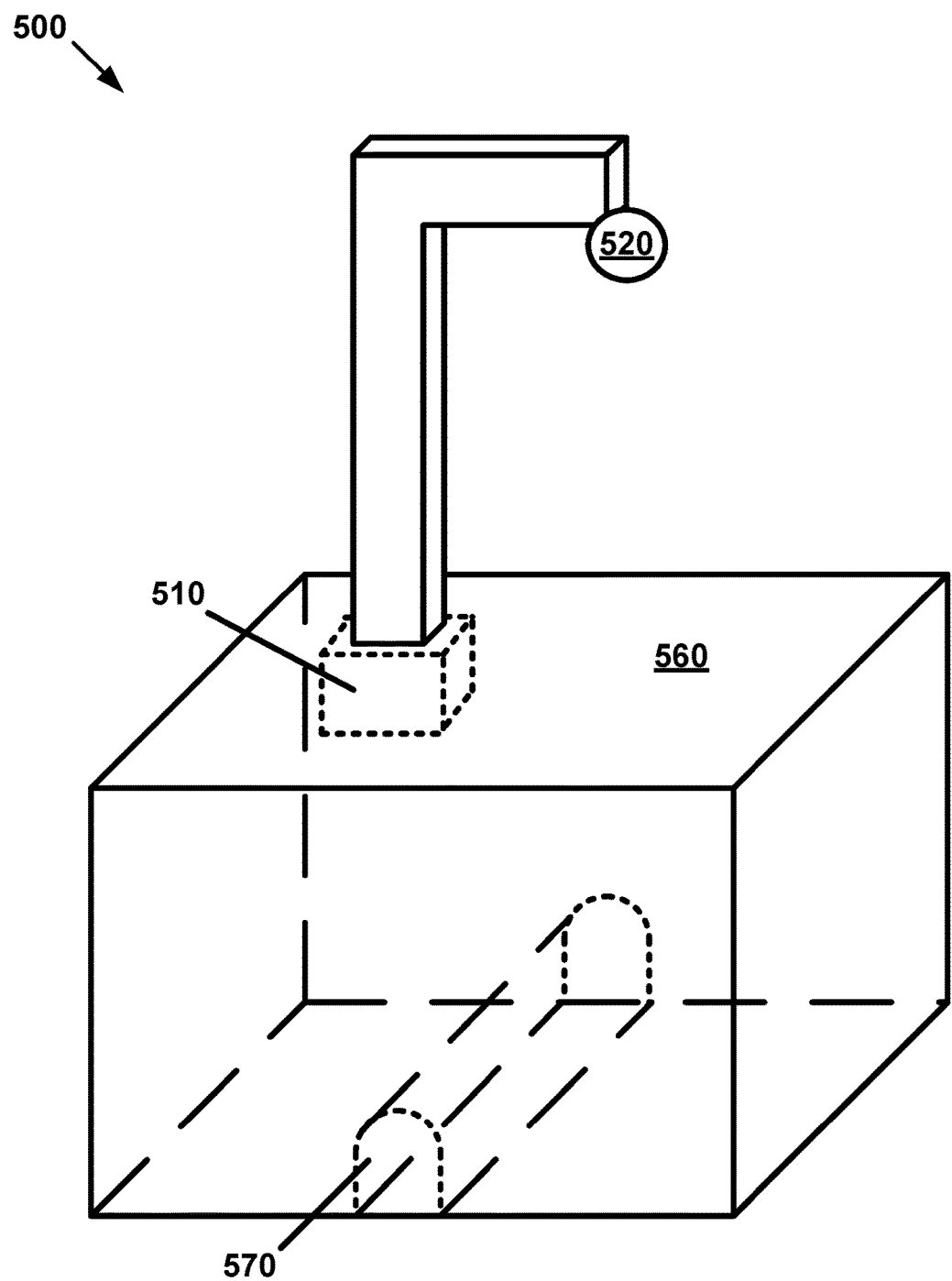
FIG. 5 is a system diagram of an obstacle system as per an aspect of an embodiment of the present invention.

Referring to FIG. 5, an obstacle system 500 is shown. In an embodiment, obstacle system 500 may comprise a base obstacle 560, a spatial profiling device 520, a mobile device manager 510, and one or more tunnels 570. Base obstacle 560 may comprise preexisting furniture within a home and/or outdoors, but may also be a specially designed structure. In an embodiment, spatial profiling device 520 may attach to base obstacle 560 by, for example, an arm that supports the spatial profiling device 520. Spatial profiling device 520 may communicate with mobile device manager 510. Utilizing captured spatial profiles, mobile device manager 510 may detect the locations of mobile objects and/or mobile devices and plot navigation procedures for mobile devices. Further, mobile device manager 510 may be configured to communicate with mobile devices, transmitting and/or receiving information such as navigation instructions, spatial profile information generated by the mobile device, mobile device location information, mobile object location information, a combination thereof, and/or the like.

Obstacle system 500 may comprise one or more tunnels 570 that may be utilized by a mobile device. According to an embodiment, tunnels 570 may take various shapes and may be large enough to house the mobile device. Tunnels 570 may also pass completely through or only partially through base obstacle 560.

Figure 6A:
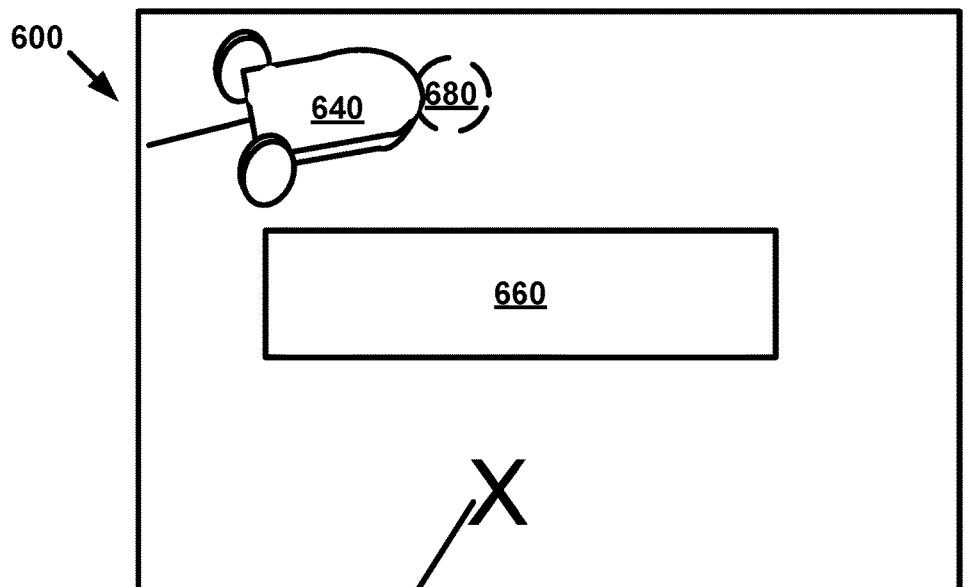
FIG. 6A is a system diagram of a screen display as per an aspect of an embodiment of the present invention.

Referring to FIG. 6A, a screen display 600 is shown. Screen display 600 may appear on a desktop or laptop computer. Screen display 600 may appear on a device with a touch screen interface such as a mobile phone, a tablet, and/or the like. Screen display 600 may display an image generated from a camera. Screen display 600 may display an image that is being captured in real-time. In an embodiment, screen display 600 may display a mobile device 640, an obstacle 660, a starting location 680, and a final location 690.

Mobile device 640 may be a remotely controlled device. A user may direct the movement of mobile device 640 based on the visual information provided to the user on screen display 600. The user may provide an input and specify a final location 690 for the mobile device 640 to move. User input may come from a selection using computer periphery such as a mouse click and/or a tap on a touch screen display. A user could potentially shift the area displayed on the screen, allowing the user to make a final location 690 selection beyond the initial frame shown. FIG. 6A illustrates a user selection of a final location 690 on the opposite side of obstacle 660 relative to the starting location 680 of the mobile device 640.

Figure 6B:
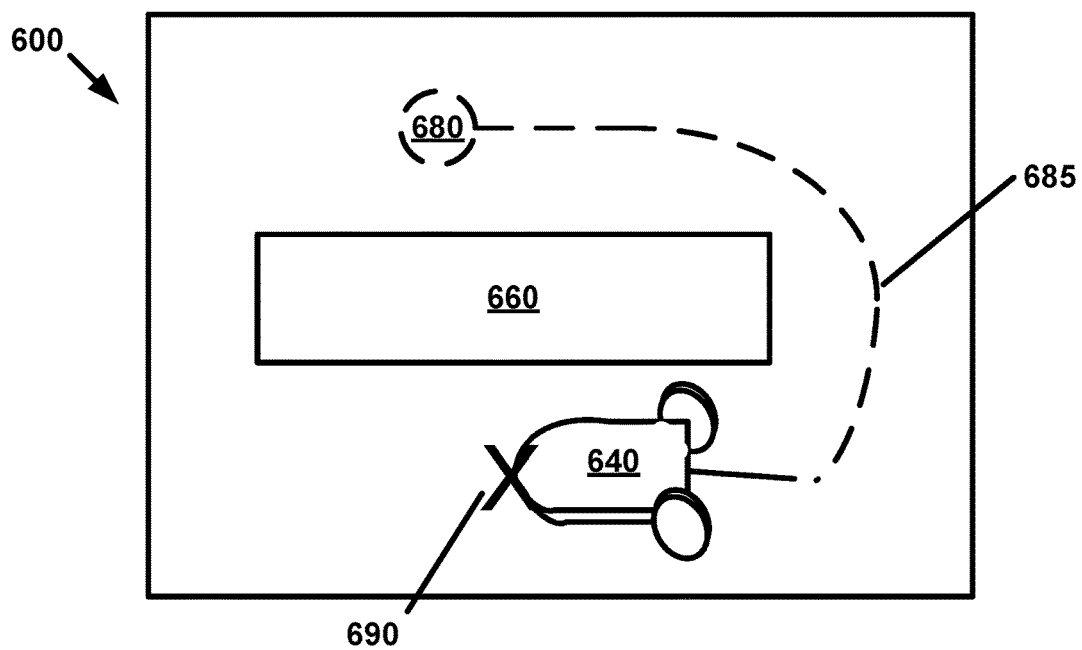
FIG. 6B is a system diagram of a screen display as per an aspect of an embodiment of the present invention.

FIG. 6B shows screen display 600 after the mobile device 640 has moved from starting location 680 to final location 690. To complete this movement, mobile device 640 may follow path 685. In an embodiment, path 685 may be curved and may curve around obstacle 660 so that mobile device 640 may arrive at final location 690 without colliding with obstacle 660. Proximity sensors on mobile device 640 may be employed to avoid collision.

Image recognition, employing the imaging device used to generate the image displayed on screen display 600, may be employed to plan a movement based on visually recognizing obstacle 660. Computation to plan and execute the mobile device 640 movement may occur on a mobile device manager that may be disposed on the user input device, the mobile device 640, or within obstacle 660.

Figure 7:
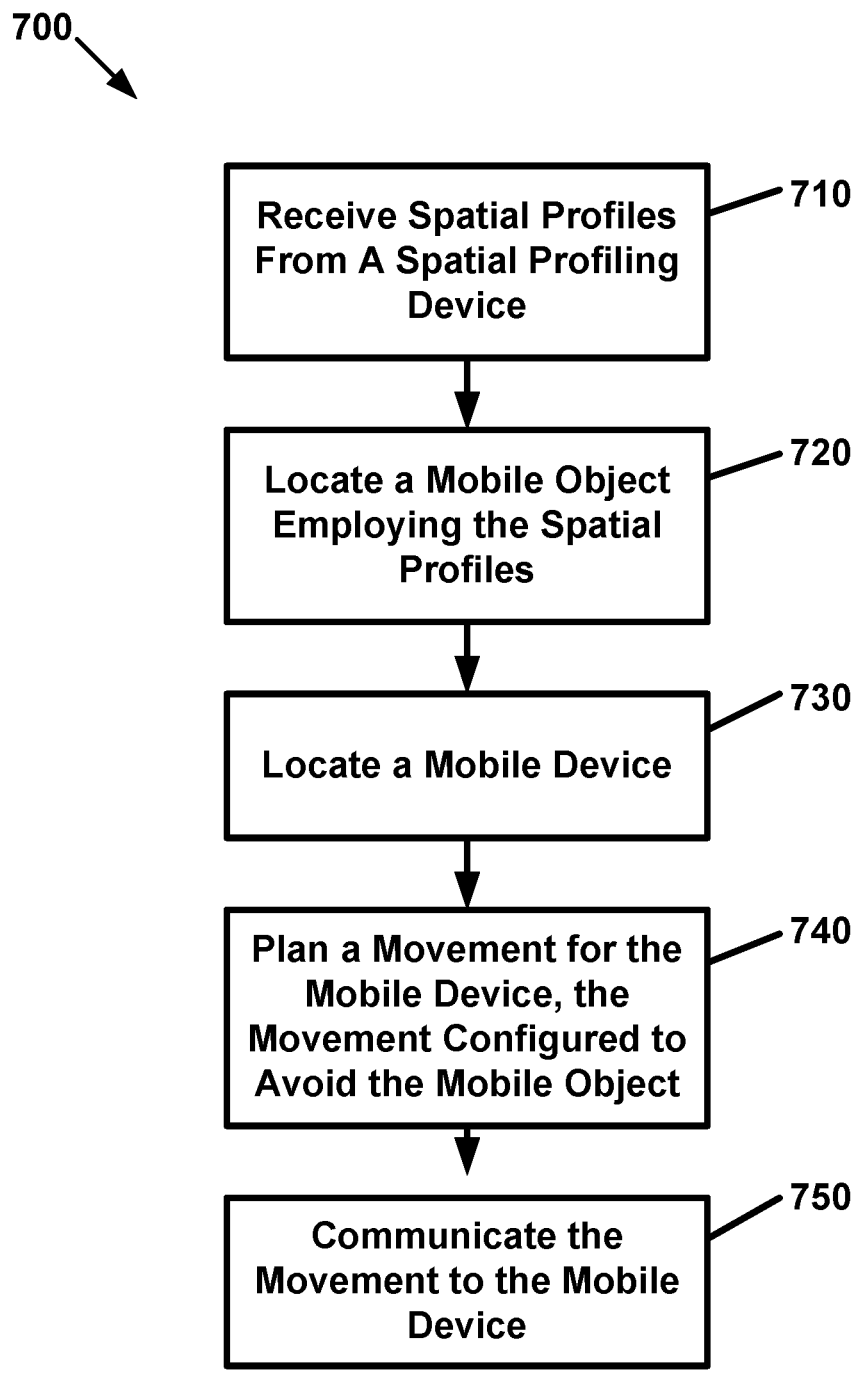
FIG. 7 is a flow diagram of an avoidance process as per an aspect of an embodiment of the present invention.

FIG. 7 is a flow diagram of an avoidance method 700. According to an embodiment, spatial profiles may be received from a spatial profiling device at 710. At 720, the received spatial profiles may be employed in locating a mobile object. At 730, a mobile device may be located. At 740, a movement for the mobile device may be planned. The movement may be configured to avoid the mobile object. According to an embodiment, the avoidance may comprise identifying a hiding location that may be outside of the view of the mobile object. In another embodiment, the movement may be planned such that an obstacle may be positioned between the mobile device and the mobile object. At 750, the planned movement may be communicated to the mobile device.

Figure 8:
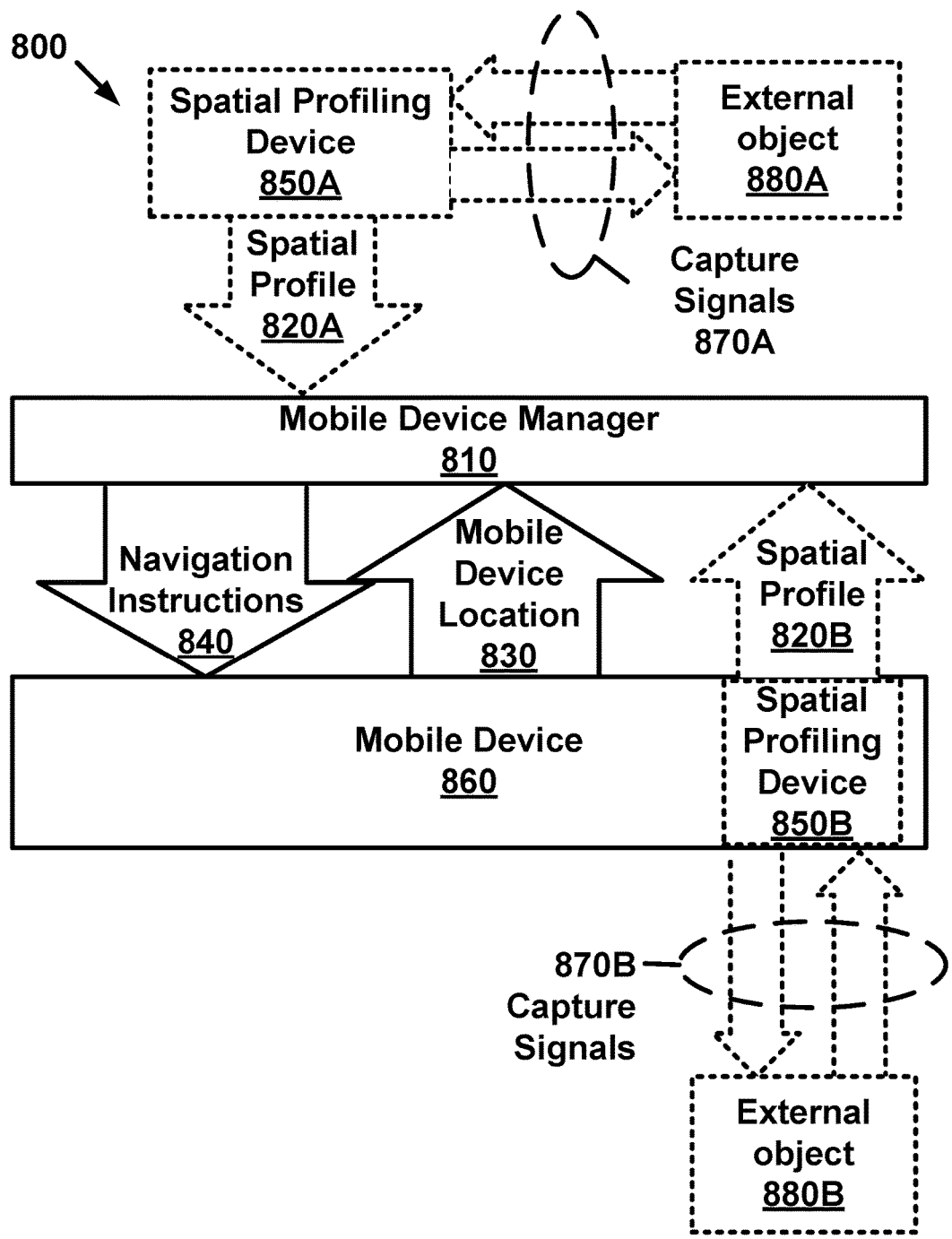
FIG. 8 is a block diagram of a system interaction as per an aspect of an embodiment of the present invention.

FIG. 8 is a block diagram of system interaction 800. According to an embodiment, information may flow into and out of mobile device manager 810. For example, spatial profiles (e.g., 820A and/or 820B) may flow from spatial profiling device (e.g., 850A and/or 850B) into mobile device manager 810. Further, mobile device manager 810 may receive information concerning the mobile device location 830 from mobile device 860. In terms of transmitted information, mobile device manager 810 may send navigation instructions 840 to mobile device 860.

A spatial profile (e.g., 820 and/or 820B), may be generated employing a spatial profiling device (e.g., 850A and/or 850B). Spatial profiling device 850B may reside on mobile device 860. Spatial profiling device 850A may reside external to mobile device manager 810 and mobile device 860. In either embodiment, spatial profiling device (e.g., 850A and/or 850B) may utilize capture signals (e.g., 870A and/or 870B) to interface with an external object (e.g., 880A and/or 880B). Capture signals (e.g., 870A and/or 870B) may represent the capturing of an image when spatial profiling device (e.g., 850A and/or 850B) is in view of a camera. Capture signals (e.g., 870A and/or 870B) may employ emitter/detector pairs which utilize emitted infrared, visible, or ultraviolet light to detect proximity. Spatial profiling device (e.g., 850A and/or 850B) may utilize a detector to measure the amount of light reflected by external object (e.g., 880A and/or 880B) to formulate a spatial profile (e.g., 820A and/or 820B).

Figure 9:
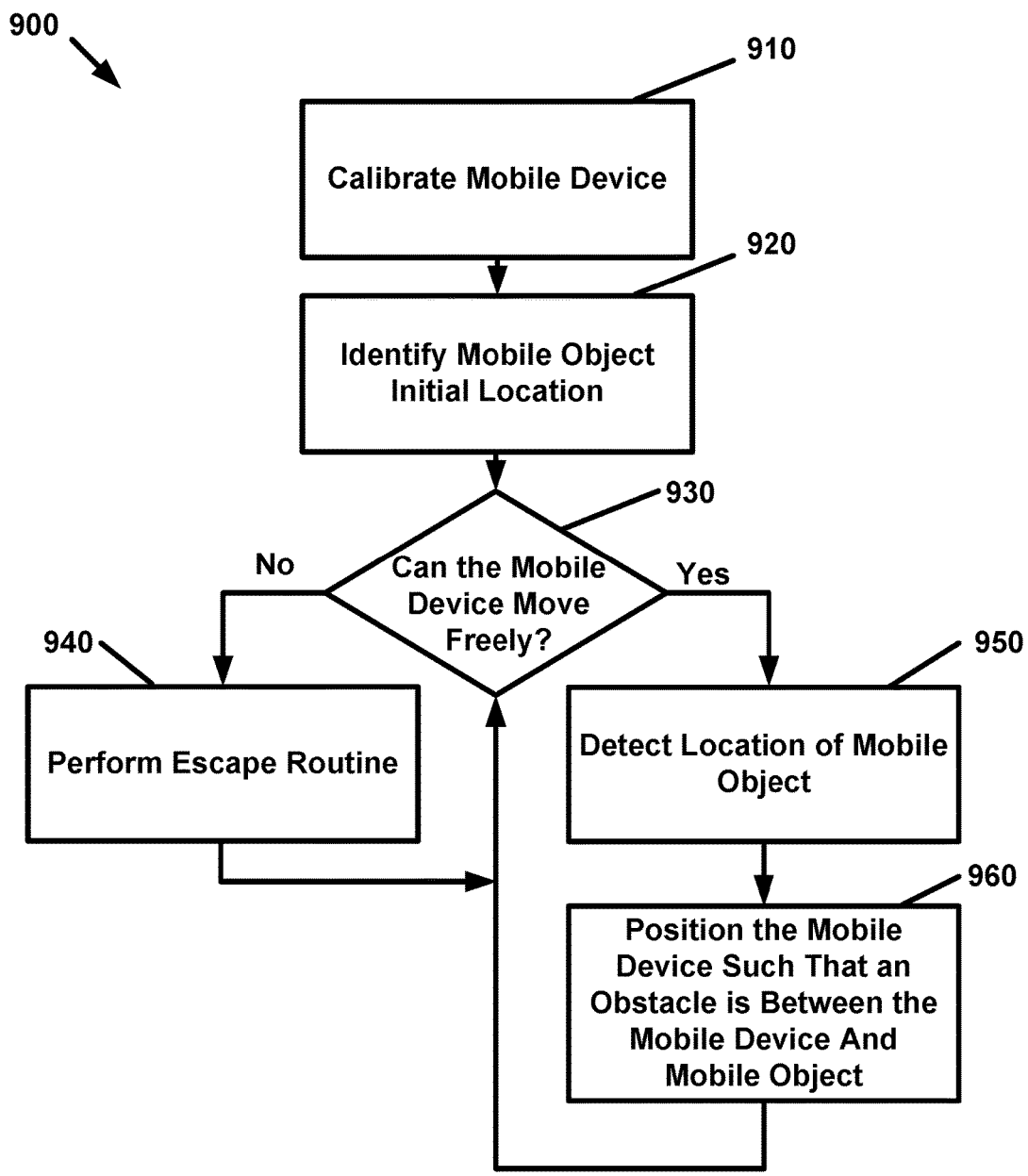
FIG. 9 is a flow diagram of an avoidance process as per an aspect of an embodiment of the present invention.

FIG. 9 is a flow diagram of avoidance method 900. According to an embodiment, avoidance method 900 may calibrate a mobile device at 910. At 920, a mobile object's initial location may be identified. At 930, a check may be made to determine whether the mobile device can move freely. If the mobile device cannot move freely, an escape routine may be performed at 940. If the mobile device can move freely, the location of a mobile object may be detected at 950 and the mobile device may be positioned such that an obstacle is between the mobile device and the mobile object at 960.

Figure 10:
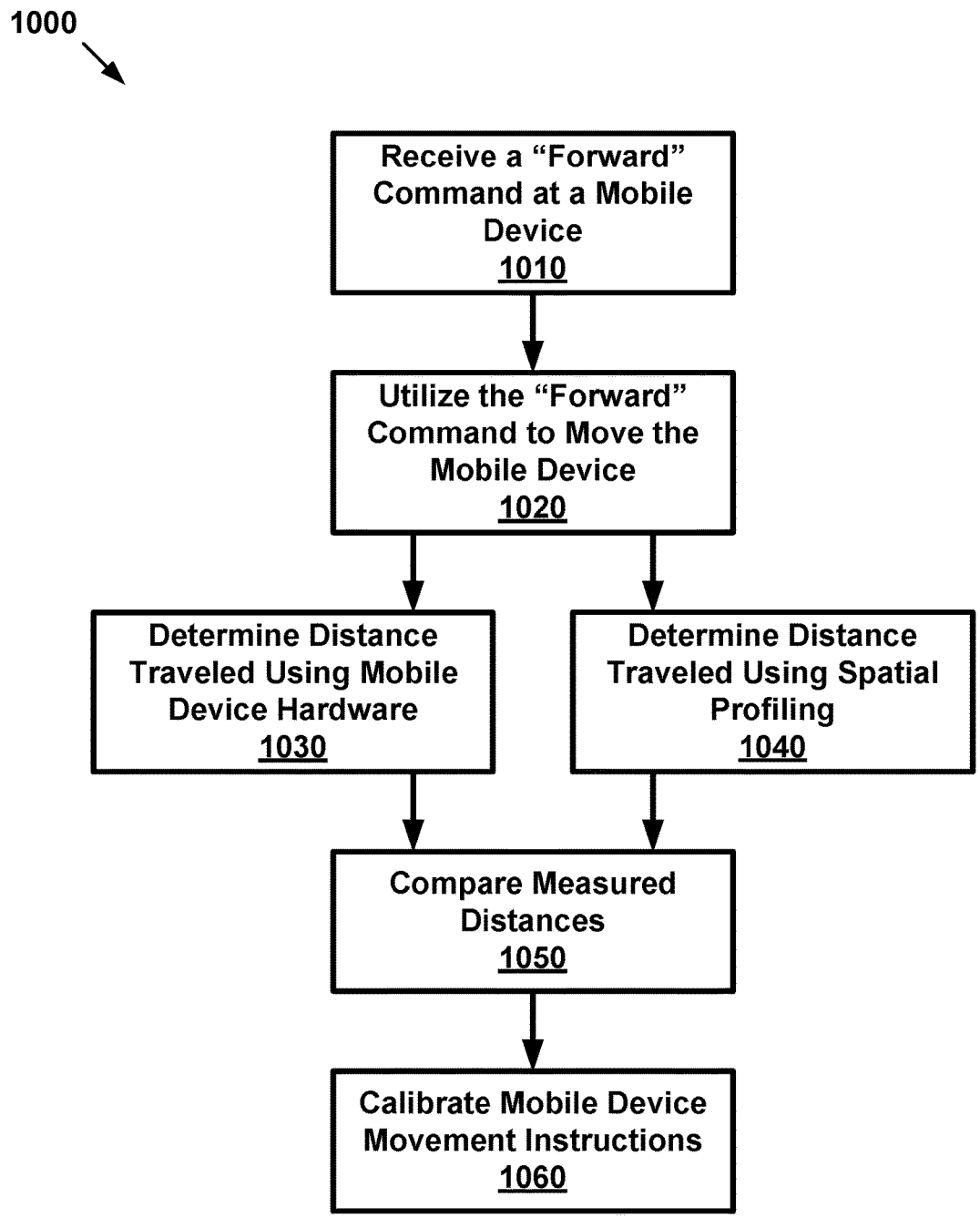
FIG. 10 is a flow diagram of a calibration process as per an aspect of an embodiment of the present invention.

FIG. 10 is a flow diagram of calibration method 1000. According to an embodiment, a "forward" command may be received at a mobile device at 1010. At 1020, the "forward" command may be utilized to move the mobile device. According to an embodiment, the utilization of the "forward" command may cause the mobile device to move in a straight line. At 1030, the distance traveled may be determined employing the mobile device sensing hardware. This determination may be accomplished, for example, employing counts from a wheel encoder. At 1040, distance traveled may be determined employing spatial profiling. This determination may be accomplished employing a spatial profiling device such as a camera. The camera may be onboard the mobile device and/or externally mounted in a manner such that the mobile device is visible to the lens of the camera. At 1050, two measured distances may be compared. According to an embodiment, the comparison may result in a difference between the measured distances. At 1060, the difference between the measured distances may be employed to calibrate the navigation instructions commanding the movement of the mobile device. In an embodiment, calibration may adjust either the instructions used by the spatial profiling device, the instructions used in formulating a navigation instruction, or both.

Figure 11:
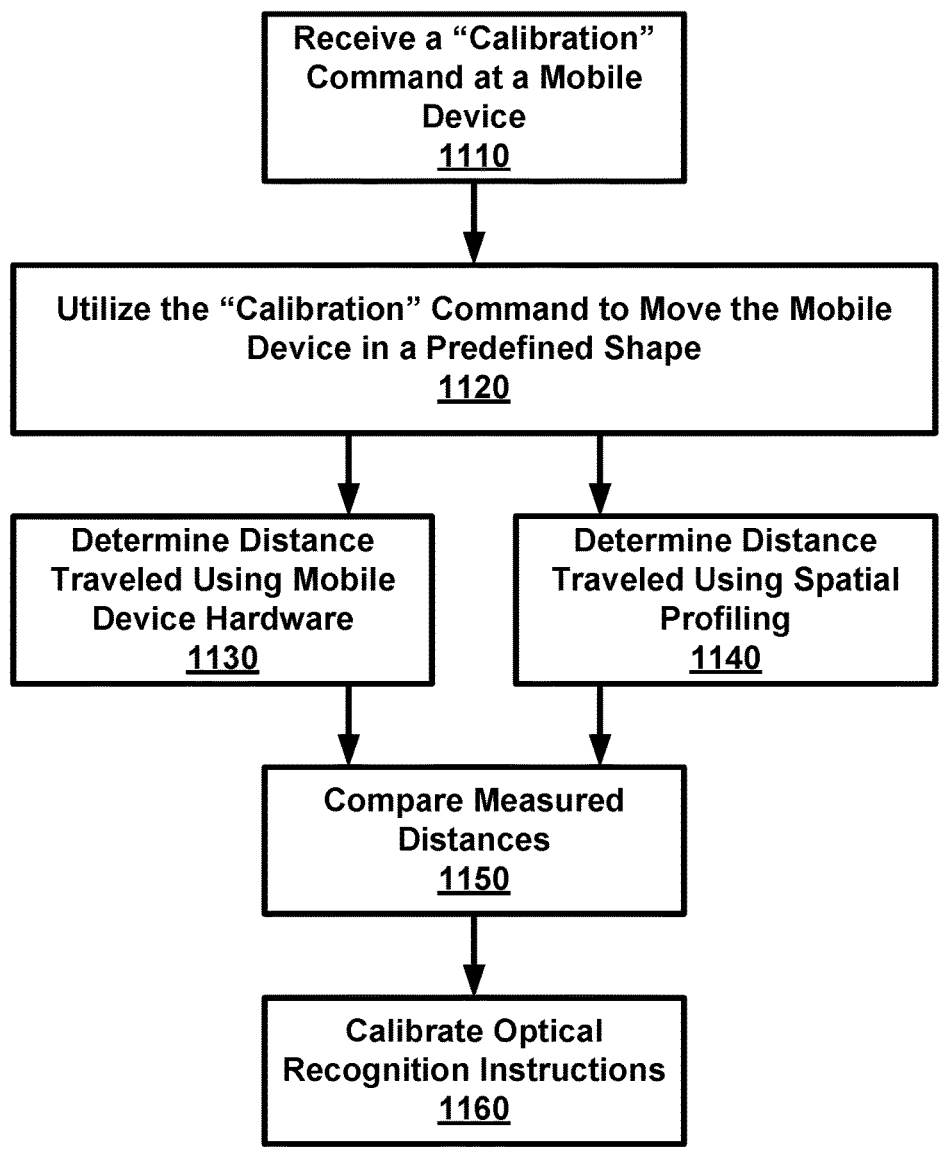
FIG. 11 is a flow diagram of a calibration process as per an aspect of an embodiment of the present invention.

FIG. 11 is a flow diagram of a calibration method 1100. According to an embodiment, a "calibration" command may be received at a mobile device at 1110. At 1120, the "calibration" command may be utilized to move the mobile device in a predefined path. In an embodiment, the predefined path may follow a circle, square, a triangle, a combination thereof, and/or the like. At 1130, the distance traveled may be determined employing the mobile device hardware. This determination may be accomplished employing counts from a wheel encoder. At 1140, the distance traveled may be determined employing spatial profiling. This determination may be accomplished employing a spatial profiling device such as, for example, a camera which may be onboard the mobile device and/or externally mounted in a manner such that the mobile device is visible to the lens of the camera. By moving along a predefined path, the measurement captured employing spatial profiling may provide additional information, which may include information concerning the positioning of the spatial profiling device. For example, moving along a predefined shape may yield differing results between spatial profiling devices that are pointed directly toward the ground versus a spatial profiling device that is tilted. At 1150, the two measured distances may be compared. According to an embodiment, the comparison may result in a difference between the measured distances. At 1160, the difference between the measured distances may be employed to calibrate the instructions used in commanding the movement of the mobile device. According to an embodiment, the calibration may adjust either the instructions employed by the spatial profiling device, the instructions employed in formulating a navigation instruction, or both.

Figure 12:
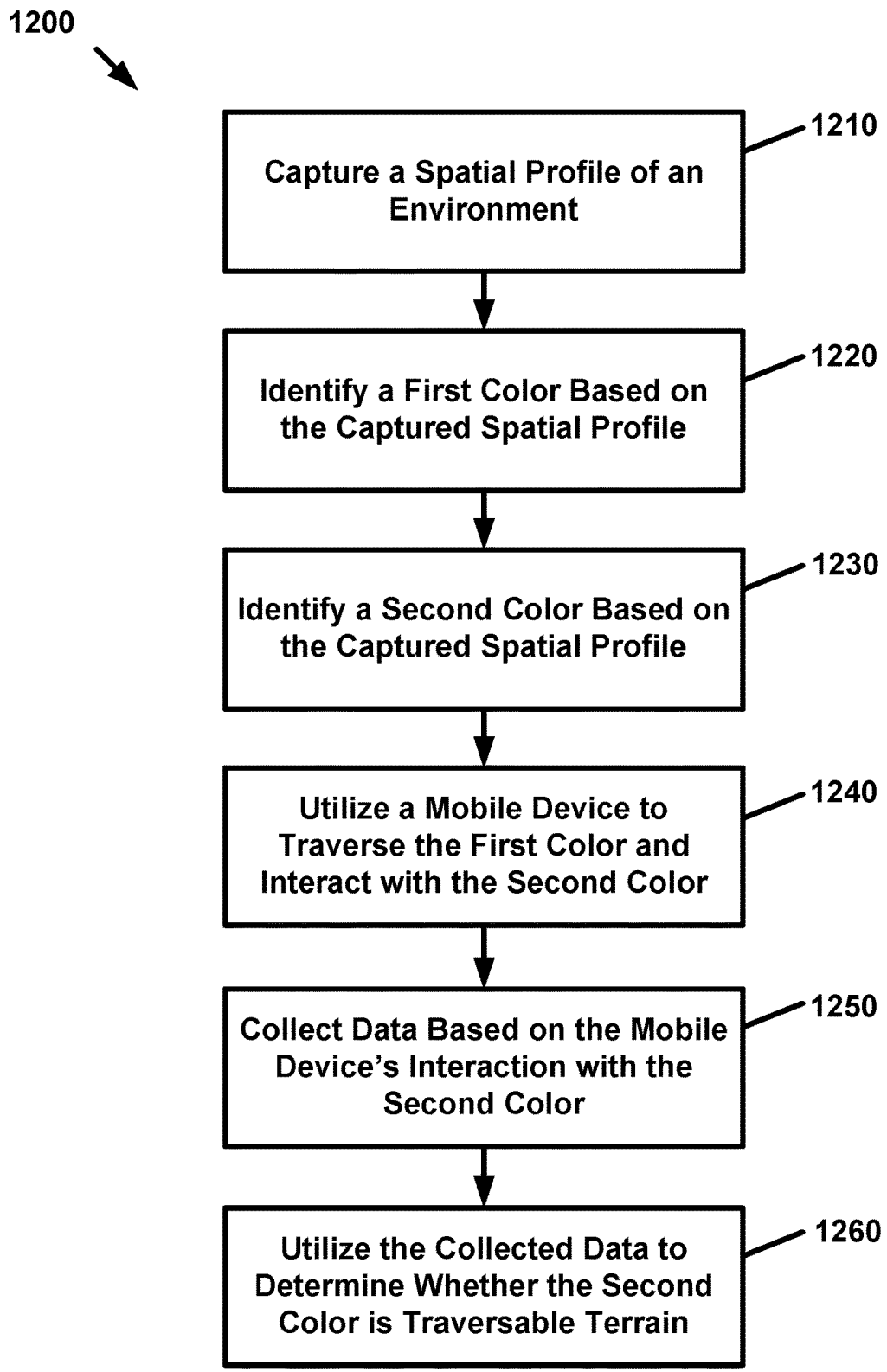
FIG. 12 is a flow diagram of an obstacle detection process as per an aspect of an embodiment of the present invention.

FIG. 12 is a flow diagram of an obstacle detection method 1200. According to an embodiment, a spatial profile of an environment may be captured at 1210. At 1220, a first color may be identified based on the captured spatial profile. At 1230, a second color may be identified based on the captured spatial profile. At 1240, a mobile device may be employed to traverse the first color and interact with the second color. According to an embodiment, the interaction with the second color may occur by commanding the mobile device to drive into the second color. In another embodiment, a mobile device equipped with proximity sensors may drive close to the edge of the area labeled as the second color. The mobile device may interact with the second color employing an emitter/detector pair of infrared light, visible light, ultraviolet light, a combination thereof, and/or the like. At 1250, data may be collected based on the mobile device's interaction with the second color. In an embodiment where the mobile device is driven into the second color, the data collected may be an inertial measurement from accelerometers, gyroscopes, a combination thereof, and/or the like. This data may reflect a collision with the area marked as a second color. In the embodiment where the interaction occurs based on an emitter/detector pair, the detector may or may not detect a reflection. At 1260, the collected data may be employed to determine whether the second color is traversable terrain. In an embodiment where the mobile device is driven into the second color, a sudden change in acceleration may reflect a collision with an obstacle. In this case, the second color may be labeled as terrain that may not be traversable. In an embodiment where the interaction occurs based on an emitter/detector pair, a strong detected reflection may indicate the presence of an obstacle that may not be traversable while a lack of detected reflection may indicate that an obstacle may not be present and the terrain may be traversable. Both of these embodiments, along with others, may be employed to detect obstacles.

Figure 13:
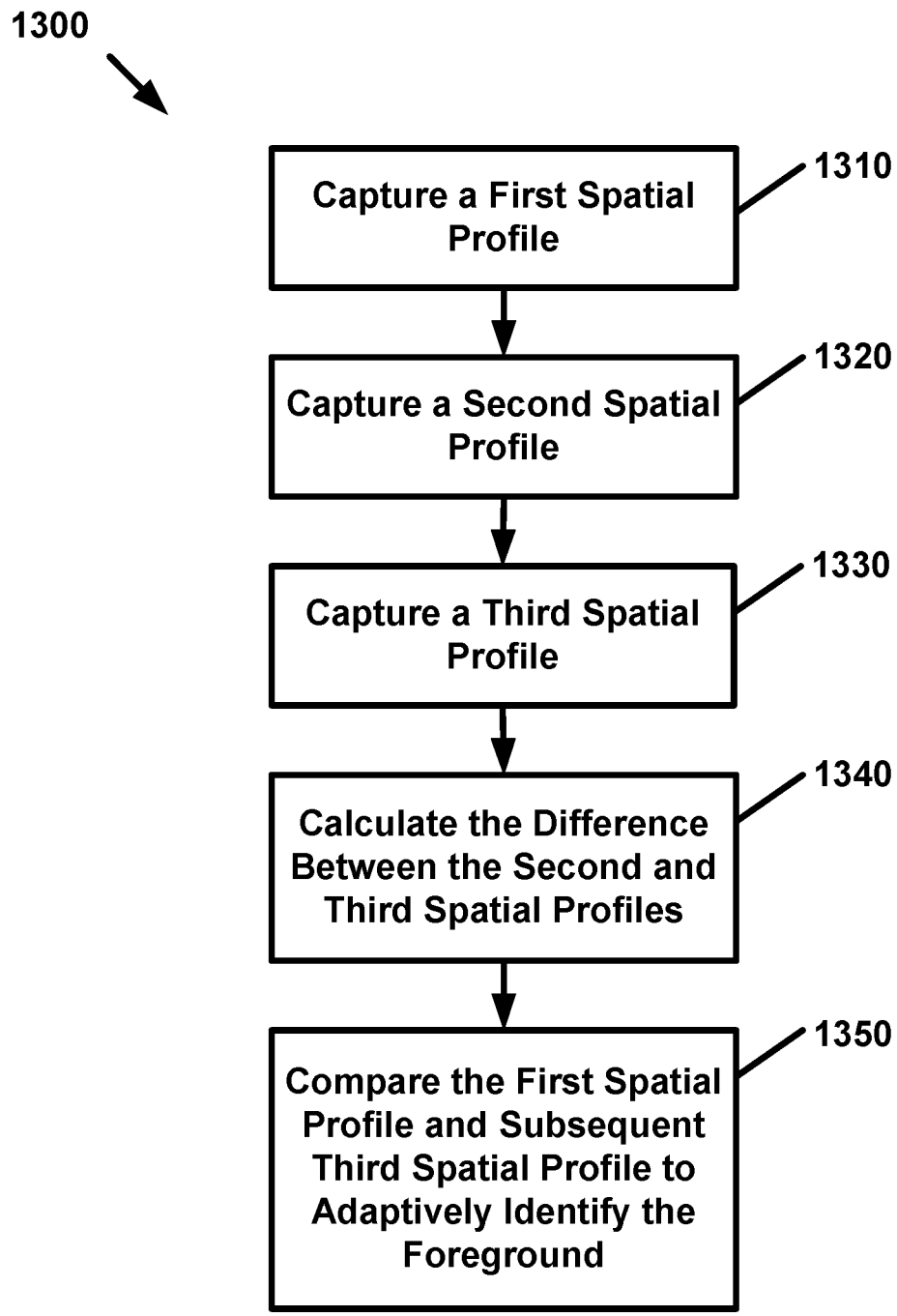
FIG. 13 is a flow diagram of a mobile object detection process as per an aspect of an embodiment of the present invention.

FIG. 13 is a flow diagram of a mobile object detection method 1300. According to an embodiment, a first spatial profile may be captured at 1310. At 1320, a second spatial profile may be captured. At 1330, a third spatial profile may be captured. At 1340, the difference between the second and third spatial profiles may be calculated. Motion detection techniques may be employed where, for example, spatial profiles are images. At 1350, the first spatial profile may be compared with the third spatial profile to adaptively identify the foreground. Step 1350 may be repeated in order to adaptively identify the foreground to compare with the background generated from the first spatial profile and other continuously updated first spatial profiles. According to an embodiment, mobile object detection method 1300 may be completed employing computer vision techniques. Computer vision techniques may comprise foreground detection techniques such as, for example, background detection, temporal average filters, training times, Gaussian adaptation, 3D data acquisition and reconstruction, a combination thereof, and/or the like.

Figure 14:
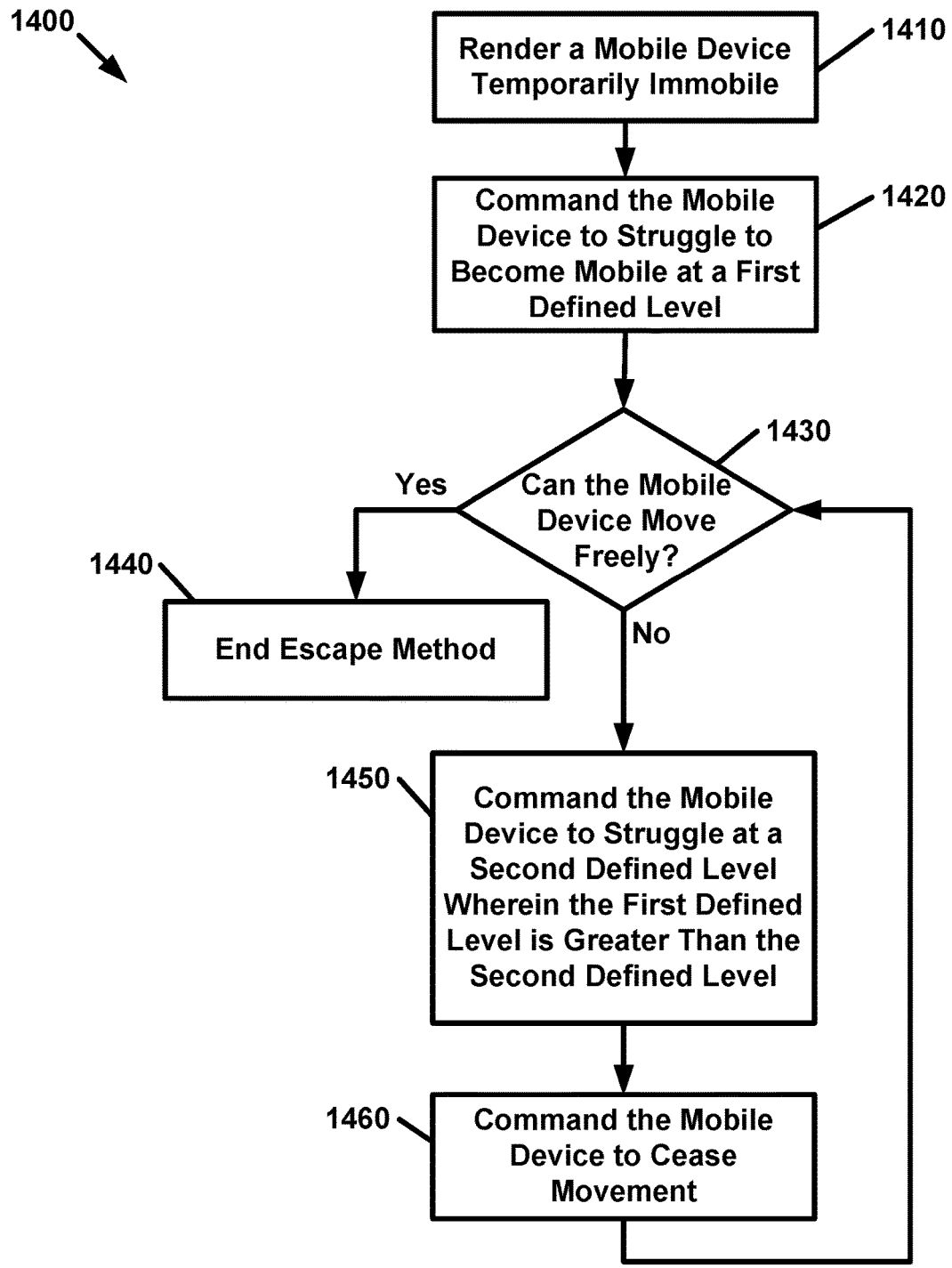
FIG. 14 is a flow diagram of an escape process as per an aspect of an embodiment of the present invention.

FIG. 14 is a flow diagram of an escape method 1400. According to an embodiment, a mobile device may be temporarily rendered immobile at 1410. A mobile device may be rendered temporarily immobile by a force external to the mobile device such as, for example, a cat grabbing or blocking the mobile device. At 1420, the mobile device may be commanded to struggle at a first defined level to become mobile. At 1430, a check may be performed to determine if the mobile device is able to move freely. If the mobile device is able to move freely, escape method 1400 may end 1440. If the mobile device is unable to move freely, at 1450, the mobile device may be commanded to struggle at a second defined level. The first defined level may be greater than the second define level. At 1460, the mobile device may be commanded to cease movement. This movement pattern may simulate a "dying" effect seen when a larger animal catches a smaller animal—for example, when a cat catches a mouse. As the smaller animal is caught, the smaller animal may lose life until the smaller animal ceases to move or struggle. After recognizing this behavior, the larger animal may lose interest in the smaller animal, allowing the smaller animal to become mobile again. This behavior is reflected by checking to see whether the mobile device is free again at 1430.

Figure 15:
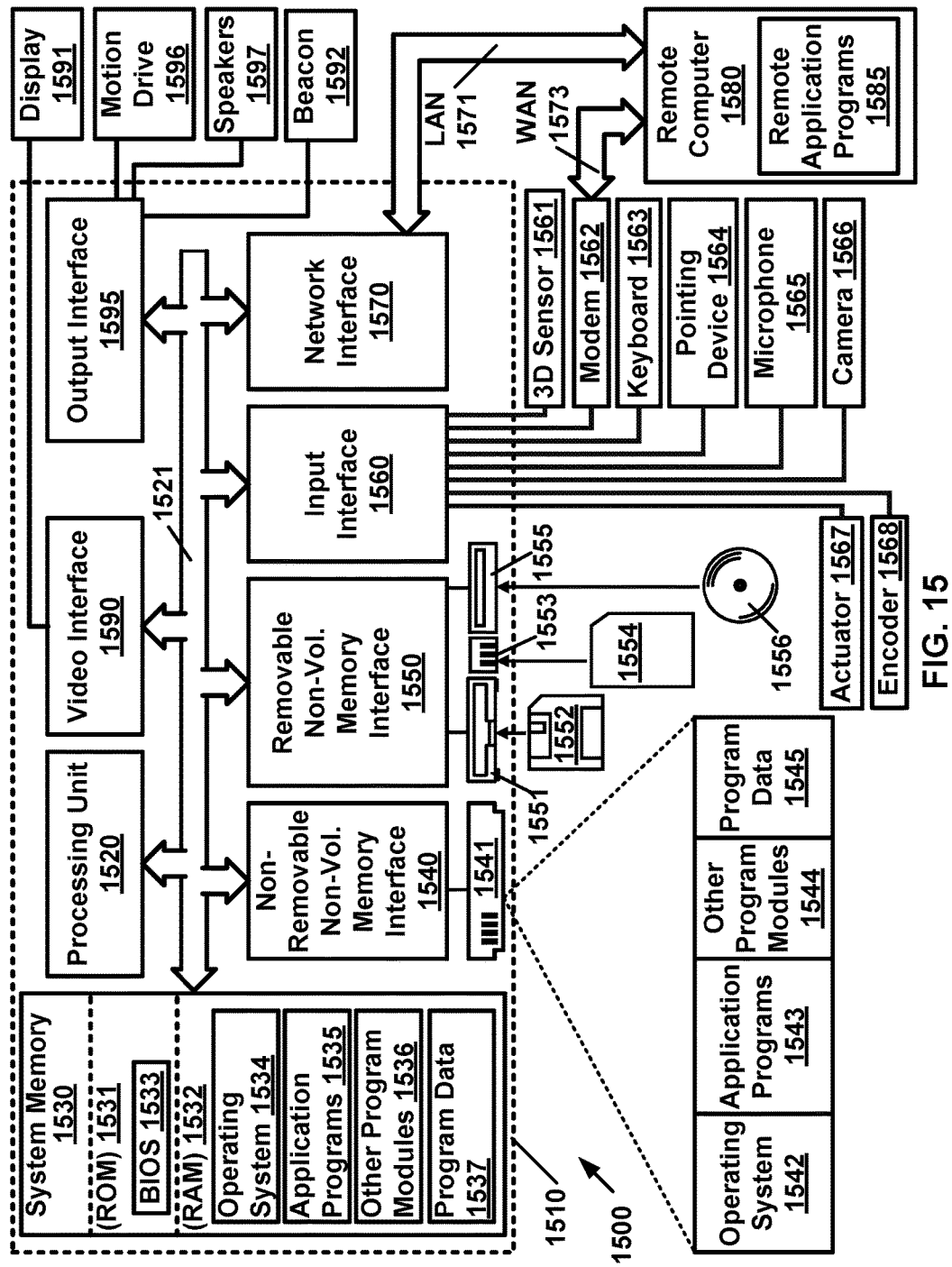
FIG. 15 is a block diagram of a computer system as per an aspect of an embodiment of the present invention.

Referring to FIG. 15, an example system 1500 for implementing some embodiments includes a computing device 1510. Components of computer 1510 may include, but are not limited to, a processing unit 1520, a system memory 1530, and a system bus 1521 that may couple various system components including the system memory to the processing unit 1520.

Computing device 1510 may comprise a variety of computer readable media. Computer readable media may be media that may be accessed by computing device 1510 and may comprise volatile and/or nonvolatile media, and/or removable and/or non-removable media. By way of example, and not limitation, computer readable media may comprise computer storage media and communication media. Computer storage media may comprise volatile and/or nonvolatile, and/or removable and/or non-removable media implemented in a method and/or technology for storage of information such as computer readable instructions, data structures, program modules or other data. Computer storage media comprises, but is not limited to, random access memory (RAM), read-only memory (ROM), electrically erasable programmable read-only memory (EEPROM), flash memory or other memory technology, compact disc read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by computer 1510. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media may comprise wired media such as a wired network or direct-wired connection, and wireless media such as acoustic, radio frequency (RF), infrared and other wireless media configured to communicate modulated data signal(s). Combinations of any of the above may also be included within the scope of computer readable media.

The system memory 1530 may comprise computer storage media in the form of volatile and/or nonvolatile memory such as ROM 1531 and RAM 1532. A basic input/output system (BIOS) and/or extensible Firmware Interface (EFI) 1533 comprising basic routines that may help to transfer information between elements within computer 1510, such as during start-up, may be stored in ROM 1531. RAM 1532 may comprise data and/or program modules that may be immediately accessible to and/or presently being operated on by processing unit 1520. By way of example, and not limitation, FIG. 15 illustrates operating system 1534, application programs 1535, other program modules 1536, and/or program data 1537 that may be stored in RAM 1532.

Computing device 1510 may comprise other removable/non-removable volatile/nonvolatile computer storage media. By way of example, FIG. 15 illustrates a hard disk drive 1541 that may read from and/or write to non-removable, nonvolatile magnetic media, a magnetic disk drive 1551 that may read from or writes to a removable, nonvolatile magnetic disk 1552, a flash drive reader 1557 that may read flash drive 1558, and an optical disk drive 1555 that may read from or write to a removable, nonvolatile optical disk 1556 such as a Compact Disc Read Only Memory (CD ROM), Digital Versatile Disc (DVD), Blue-ray Disc™ (BD) or other optical media. Other removable/non-removable, volatile/nonvolatile computer storage media that may be employed in the example operating environment include, but are not limited to, magnetic tape cassettes, flash memory cards, digital versatile disks, digital video tape, solid state RAM, solid state ROM, and the like. The hard disk drive 1541 may be connected to the system bus 1521 through a non-removable memory interface such as interface 1540, and magnetic disk drive 1551 and optical disk drive 1555 may be connected to the system bus 1521 by a removable memory interface, such as interface 1550.

The drives and their associated computer storage media discussed above and illustrated in FIG. 15 may provide storage of computer readable instructions, data structures, program modules and other data for the computing device 1510. In FIG. 15, for example, hard disk drive 1541 is illustrated as storing operating system 1542, application programs 1543, program data 1545, and other program modules 1544. Additionally, for example, non-volatile memory may include instructions to, for example, discover and configure IT device(s); the creation of device neutral user interface command(s); combinations thereof, and/or the like.

A user may enter commands and information into computing device 1510 through input devices such as a keyboard 1563, a microphone 1565, a camera 1566, actuator 1567, and a pointing device 1564, such as a mouse, trackball, touch pad, and/or a touch screen interface. These and other input devices may be connected to the processing unit 1520 through a input interface 1560 that may be coupled to the system bus, but may be connected by other interface and bus structures, such as a parallel port, game port or a universal serial bus (USB).

Actuator 1567 may be connected to the system bus 1521 via Input Interface 1560. A 3D sensor 1561 may be connected to the system bus 1521 via Input 1560. Examples of 3D sensor(s) 1561 comprise an accelerometer, an inertial navigation unit, a 3D digitizer, and/or the like. A modem 1562 may be connected to the system bus 1521 via input interface 1560.

Encoder 1568 may be connected to system bus 1521 via input interface 1560. Encoder 1568 may be coupled to wheels and/or provide rotational data.

A monitor 1591 or other type of display device may be connected to the system bus 1521 via an interface, such as a video interface 1590. Other devices, such as, for example, speakers 1597 and motion drive 1596 may be connected to the system via output interface 1595. Motion drive 1596 may comprise a battery to supply electricity, DC or AC motors, and any necessary control mechanisms such as, for example, an H bridge.

Computing device 1510 may be operated in a networked environment using logical connections to one or more remote computers, such as a remote computer 1580. The remote computer 1580 may be a personal computer, a mobile device, a hand-held device, a server, a router, a network PC, a medical device, a peer device or other common network node, and may comprise many or all of the elements described above relative to the computing device 1510. The logical connections depicted in FIG. 15 include a local area network (LAN) 1571 and a wide area network (WAN) 1573, but may also comprise other networks such as, for example, a cellular network. Such networking environments are commonplace in offices, enterprise-wide computer networks, intranets and the Internet.

When used in a LAN networking environment, computing device 1510 may be connected to the LAN 1571 through a network interface or adapter 1570. When used in a WAN networking environment, computing device 1510 typically includes a modem 1562 or other means for establishing communications over the WAN 1573, such as the Internet. The modem 1562, which may be internal or external, may be connected to the system bus 1521 via the input interface 1560, or other appropriate mechanism. The modem 1562 may be wired or wireless. Examples of wireless devices may comprise, but are limited to: Wi-Fi, Near-field Communication (NFC) and Bluetooth®. In a networked environment, program modules depicted relative to computing device 1510, or portions thereof, may be stored in a remote computer 1580. By way of example, and not limitation, FIG. 15 illustrates remote application programs 1585 as residing on remote computer 1580. It will be appreciated that the network connections shown are exemplary and other means of establishing a communications link between the computers may be used. Additionally, for example, LAN 1571 and WAN 1573 may provide a network interface to communicate with other distributed infrastructure management device(s); with IT device(s); with users remotely accessing input interface 1560; combinations thereof, and/or the like.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Alternative embodiments may comprise include utilizing multiple mobile devices to create a game. The game may be played on a tabletop or on the ground. The game may involve user control of multiple mobile devices. Alternative embodiments may comprise utilizing mobile devices to entertain children and/or adults. Children and/or adults may chase mobile devices. Thus, the present embodiments should not be limited by any of the above described embodiments.

In addition, it should be understood that the figures and algorithms, which highlight the functionality and advantages of the present invention, are presented for example purposes only. The architecture of the present invention is sufficiently flexible and configurable, such that it may be utilized in ways other than that shown in the accompanying figures and algorithms. For example, the steps listed in any flowchart may be re-ordered or only optionally used in some embodiments.

It should be noted the terms "including" and "comprising" should be interpreted as meaning "including, but not limited to".

In this specification, "a" and "an" and similar phrases are to be interpreted as "at least one" and "one or more." References to "the," "said," and similar phrases should be interpreted as "the at least one", "said at least one", etc. References to "an" embodiment in this disclosure are not necessarily to the same embodiment.

It is the applicant's intent that only claims that include the express language "means for" or "step for" be interpreted under 35 U.S.C. 112. Claims that do not expressly include the phrase "means for" or "step for" are not to be interpreted under 35 U.S.C. 112.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

What is claimed is:

1. A system, comprising:
    a mobile device comprising:
        a platform;
        a first communications circuit configured to receive navigation instructions; and
        a motion drive configured to propel the platform according to the navigation instructions;
    a spatial profiling device configured to capture a spatial profile of a motion area; and
    a mobile device manager comprising:
        at least one second communications circuit configured to communicate with the first communications circuit and the spatial profiling device;
        one or more processors; and
        memory storing processing instructions that, when executed, cause the mobile device manager to:
            receive spatial profiles from the spatial profiling device;
            locate a mobile object employing the spatial profiles;
            locate the mobile device;
            plan a movement for the mobile device between a first location and a second location in the motion area, the movement configured to avoid the mobile object; and
            communicate the movement to the mobile device as navigation instructions employing the second communications circuit.

2. The system according to claim 1, wherein the mobile device further comprises an inertial measurement device connected to the first communications circuit.

3. The system according to claim 1, wherein the mobile device further comprises an infrared beacon connected to the first communications circuit.

4. The system according to claim 1, wherein the motion drive is configured to propel the platform in a flipped orientation.

5. The system according to claim 1, wherein the mobile device further comprises a tail.

6. The system according to claim 1, further comprising an obstacle located within the motion area.

7. The system according to claim 6, wherein the obstacle further comprises tunnels sized to house the mobile device.

8. The system according to claim 1, wherein the spatial profiling device is affixed on least one of the following:
    a ceiling;
    a wall; or
    a countertop.

9. The system according to claim 6, wherein the spatial profiling device is affixed on the obstacle.

10. The system according to claim 6, wherein the mobile device manager is disposed within the obstacle.

11. The system according to claim 1, wherein the mobile object is at least one of the following:
    an animal;
    a person;
    a cat; or
    a second mobile device.

12. The system according to claim 1, wherein the mobile device manager further comprises a touch screen display and the processing instructions, when executed, further cause the mobile device manager to:
    show at least one of the spatial profiles on the touch screen display; and
    determine the second location via a selection on the touch screen display.

13. The system according to claim 1, wherein the processing instructions, when executed, further cause the mobile device manager to plan the movement employing an expected movement of the mobile object.

14. The system according to claim 1, wherein the processing instructions, when executed, cause the mobile device manager to locate the mobile device employing infrared light.

15. The system according to claim 1, wherein the processing instructions, when executed, cause the mobile device manager to locate the mobile device employing a wheel encoder.

16. The system according to claim 1, wherein the processing instructions, when executed, further cause the mobile device manager to distinguish colors in the received spatial profiles.

17. The system according to claim 1, wherein the processing instructions, when executed, further cause the mobile device manager to detect a distance of at least one of the mobile device and the mobile object from a known location in the received spatial profiles.

18. The system according to claim 1, wherein the processing instructions, when executed, cause the mobile device manager to locate the mobile object employing motion detection and background detection.

19. The system according to claim 1, wherein the spatial profiling device and the mobile device manager are disposed on the platform of the mobile device.

20. A mobile device, comprising:
a platform;
a motion drive configured to propel the platform according to navigation instructions; and
a first communications circuit configured to receive navigation instructions from a second communications circuit disposed on a mobile device manager, the mobile device manager configured to communicate with a spatial profiling device and comprise memory storing processing instructions that, when executed, cause the mobile device manager to
receive spatial profiles from the spatial profiling device;
locate a mobile object employing the spatial profiles;
locate the mobile device;
plan a movement for the mobile device between a first location and a second location in a motion area, the movement configured to avoid the mobile object; and
communicate the movement to the mobile device as navigation instructions employing the second communications circuit.

* * * * *